United States Patent
Kase et al.

(10) Patent No.: US 10,065,885 B2
(45) Date of Patent: Sep. 4, 2018

(54) GLASS SHEET FOR PIGMENT PRINTING, PIGMENT-PRINTED GLASS SHEET, PRODUCTION METHOD THEREFOR, AND IMAGE DISPLAY DEVICE

(71) Applicant: Asahi Glass Company, Limited, Chiyoda-ku (JP)

(72) Inventors: Junichiro Kase, Tokyo (JP); Kazutomo Mori, Tokyo (JP); Thomas Lambricht, Louvain-la-Neuve (BE)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/392,393

(22) Filed: Dec. 28, 2016

(65) Prior Publication Data

US 2017/0174565 A1 Jun. 22, 2017

Related U.S. Application Data

(63) Continuation of application No. PCT/JP2015/069211, filed on Jul. 2, 2015.

(30) Foreign Application Priority Data

Jul. 7, 2014 (JP) .................... 2014-140052
May 11, 2015 (JP) .................... 2015-096288

(51) Int. Cl.
| | |
|---|---|
| B32B 3/00 | (2006.01) |
| C03C 17/28 | (2006.01) |
| C03C 3/087 | (2006.01) |
| C03C 4/18 | (2006.01) |
| C09D 11/037 | (2014.01) |
| C03C 21/00 | (2006.01) |
| B41M 1/12 | (2006.01) |
| B41M 1/34 | (2006.01) |
| G09F 9/302 | (2006.01) |

(52) U.S. Cl.
CPC .............. C03C 17/28 (2013.01); B41M 1/12 (2013.01); B41M 1/34 (2013.01); C03C 3/087 (2013.01); C03C 4/18 (2013.01); C03C 21/002 (2013.01); C09D 11/037 (2013.01); C03C 2204/00 (2013.01); C03C 2218/119 (2013.01); G09F 9/302 (2013.01)

(58) Field of Classification Search
CPC ....... C03C 3/083; C03C 3/087; C03C 21/002; C03C 4/18; C09D 11/037; B41M 1/12; B41M 1/34
See application file for complete search history.

(56) References Cited

U.S. PATENT DOCUMENTS

| | | |
|---|---|---|
| 5,071,796 A | 12/1991 | Jones et al. |
| 6,518,211 B1 | 2/2003 | Bradshaw et al. |
| 2003/0125188 A1 | 7/2003 | Koyama et al. |
| 2004/0157722 A1 | 8/2004 | Koyama et al. |
| 2004/0162212 A1 | 8/2004 | Koyama et al. |
| 2012/0083401 A1* | 4/2012 | Koyama ................ C03C 3/085 501/70 |
| 2012/0199203 A1 | 8/2012 | Nishizawa et al. |
| 2012/0238435 A1 | 9/2012 | Arai et al. |
| 2013/0093312 A1 | 4/2013 | Ono et al. |
| 2013/0203584 A1 | 8/2013 | Arai et al. |
| 2014/0227525 A1* | 8/2014 | Matsuda ............... C03C 21/002 428/410 |
| 2014/0329661 A1 | 11/2014 | Arai et al. |
| 2015/0072129 A1 | 3/2015 | Okahata et al. |
| 2015/0079347 A1 | 3/2015 | Miyasaka et al. |
| 2017/0050461 A1* | 2/2017 | McCurdy ............... A41G 1/001 |

FOREIGN PATENT DOCUMENTS

| | | |
|---|---|---|
| CN | 1623946 A | 6/2005 |
| CN | 102985993 A | 3/2013 |
| EP | 1 245 545 A1 | 10/2002 |
| JP | 3-93643 | 4/1991 |
| JP | 2002-507538 | 3/2002 |
| JP | 2003-160354 | 6/2003 |
| TW | 201215578 A1 | 4/2012 |
| WO | WO 2011/049146 A1 | 4/2011 |
| WO | WO 2011/068225 A1 | 6/2011 |
| WO | WO 2012/026290 A1 | 3/2012 |
| WO | WO 2012/057232 A1 | 5/2012 |
| WO | WO 2013/146438 A1 | 10/2013 |

OTHER PUBLICATIONS

International Search Report dated Aug. 25, 2015 in PCT/JP2015/069211, fled on Jul. 2, 2015 ( with English Translation).
Written Opinion dated Aug. 25, 2015 in PCT/JP2015/069211, filed on Jul. 2, 2015.

* cited by examiner

*Primary Examiner* — Elizabeth E Mulvaney
(74) *Attorney, Agent, or Firm* — Oblon, McClelland, Maier & Neustadt, L.L.P.

(57) ABSTRACT

A glass sheet for pigment printing contains, as represented by mass percentage on the basis of oxides, from 60% to 75% of $SiO_2$, from 2% to 12% of $Al_2O_3$, from 2% to 11% of MgO, from 0% to 10% of CaO, from 0% to 3% of SrO, from 0% to 3% of BaO, from 10% to 18% of $Na_2O$, from 0% to 8% of $K_2O$, and from 0% to 4% of $ZrO_2$, or contains, from 60% to 75% of $SiO_2$, from 1.5% to 12% of $Al_2O_3$, from 6% to 12% of MgO, from 0% to 4.5% of CaO, from 0% to 3% of SrO, from 0% to 3% of BaO, from 10% to 18% of $Na_2O$, from 0% to 8% of $K_2O$, and from 0% to 4% of $ZrO_2$.

12 Claims, 5 Drawing Sheets

Fig. 2

| | | Example 1 | Comparative Example 1 | Comparative Example 2 |
|---|---|---|---|---|
| Microscope | 25 Times | | | |
| | 100 Times | | | |

1: Example 1 Non-Strengthened
2: Example 1 Strengthened
3: Comparative Example 1 Non-Strengthened
4: Comparative Example 1 Strengthened A: Microscope
B: Example 2
C: Example 3
D: Example 4
E: Example 5
F: Comparative Example 3
G: Comparative Example 4

A: Microscope
B: Example 2
C: Example 3
D: Example 4
E: Example 5
F: Comparative Example 3
G: Comparative Example 4

GLASS SHEET FOR PIGMENT PRINTING, PIGMENT-PRINTED GLASS SHEET, PRODUCTION METHOD THEREFOR, AND IMAGE DISPLAY DEVICE

TECHNICAL FIELD

The present invention relates to a glass sheet for pigment printing, a pigment-printed glass sheet including a predetermined glass substrate having a pigment being printed on at least one surface thereof, a method for producing the pigment-printed glass sheet, and an image display device including the pigment-printed glass sheet.

BACKGROUND ART

In recent years, demand for portable information terminals have been increased as observed in a tablet PC, a smart phone, an electronic book reader, and the like, and in a display surface of these portable devices and in a back surface thereof in some of these devices, a chemically strengthened glass has been used as a cover glass, in which a white or black or another color pigment is printed on the inner side surface of the cover glass (for example, refer to PTL 1 and PTL 2).

The cover glass with a pigment printed on the inner side not only protects the information terminals but also causes the appearance of these devices to look nice and exclusive with glossiness. In addition, by printing a multilayer pigment which has been pattern-treated in an overlapping manner, indication of a brand or logo mark of a product and a window such as a sensor and a surrounding edging pattern are formed on a cover glass.

Such a cover glass is produced, for example, by the following process. First, a glass sheet is cut and the edges are processed to form a blank substrate. Polishing or an etching process may be performed to this blank substrate if necessary. This substrate is further cut into the size of a glass for a cover glass and a necessary perforating process or outer peripheral shape process is performed. Also, the cutting into the size of the cover glass may be performed after a chemical strengthening treatment or printing treatment described below.

A chemical strengthening treatment is executed with respect to the blank substrate or cover glass (hereinafter, also collectively referred to as "glass substrate") to enhance the strength thereof. Examples of the method for a chemical strengthening treatment include a low temperature type ion exchange method, a high temperature type ion exchange method, a surface crystallization method, and a dealkalization method.

Among these, a low temperature type ion exchange method is frequently executed, in which an alkali ion of a glass surface layer is substituted with a larger ion and a compressive stress is formed on the surface. In general, the glass substrate is immersed into potassium nitrate molten salts having a temperature of 340 to 550° C. so as to exchange a sodium ion ($Na^+$) in the glass with a potassium ion ($K^+$) having a large ion diameter.

As the glass substrate to be subjected to a chemical strengthening treatment, a glass sheet of soda-lime glass or aluminosilicate glass including a great amount of $Al_2O_3$, for example, 14% by mass or greater has been used. The aluminosilicate glass is a glass whose composition is designed for a chemical strengthening treatment and the chemical strengthening treatment enables an achievement of the high strength thereof. However, an expensive raw material is used for the production thereof and it is necessary to perform melting at high temperature, accordingly, which takes a cost a lot.

On the other hand, the soda-lime glass is a glass having the same composition as a common window glass and is produced at a low cost. However, it is difficult to obtain the same high strength as the aluminosilicate glass by the chemical strengthening treatment.

In general, the strength properties of the chemically strengthened glass are represented by surface compressive stress (CS; Compressive stress) and depth of compressive stress (DOL; Depth of layer). In the case where a common soda-lime glass is subjected to a chemical strengthening treatment as a blank glass, in general, a chemically strengthened glass having CS of 500 to 600 MPa and DOL of 6 to 10 μm is obtained. In addition, in the case where the aluminosilicate glass is subjected to a chemical strengthening treatment as a blank glass, a chemically strengthened glass having CS of 700 to 850 MPa and DOL of 20 to 100 μm is obtained.

In the glass substrate which has been subjected to a chemical strengthening treatment, subsequently, a desired pigment printing is performed on the single surface thereof. In general, screen printing is used for printing on the glass substrate. The printing is performed such that the glass substrate is provided to a screen printing machine and a pigment ink is applied thereto in a multilayered and overlapping manner so as to form a pattern such as a logo mark.

After printing, heating at a temperature of about 60 to 150° C. is performed in the case of thermosetting pigment ink, and irradiation with ultraviolet rays (UV) is performed to cure the printed pigment ink in the case of a UV curable ink. The printing and curing treatment are repeated in a plurality of times if necessary. The cover glass which has been finished in this way is incorporated into portable devices so that the pigment-printed surface thereof faces the inner side.

Here, the pigment printed on the cover glass may be peeled off in a cleaning step before installing the cover glass to the portable devices or after being used for a certain period of time as the portable devices. The peeling off of pigment printing frequently occurs at the interface portion where the pigment is laminated, the pigment forming a logo mark, a sensor window, an edging pattern, or the like, and defects in the appearance of the devices become remarkable.

CITATION LIST

Patent Literature

[PTL 1] WO2013/146438
[PTL 2] WO2012/026290

SUMMARY OF INVENTION

Technical Problem

Regarding the peeling off of the printed pigment from the cover glass, it has been studied to solve the problem by adjusting the composition or other physical properties of a pigment conventionally. However, even if adhesion immediately after printing the pigment is enhanced due to this study, it was not sufficient for preventing the peeling off after the usage for a long period of time.

In addition, a user may drop the portable devices by mistake and accordingly, a cover glass in which the strength against the dropping accident can be guaranteed is demanded. As the material of this cover glass, the aforementioned aluminosilicate glass can obtain a high strength but is expensive, and the soda-lime glass is inexpensive but is poor in the strength, which is a problem.

An object of the present invention is to provide a glass sheet for pigment printing, which can provide a cover glass having excellent adhesion to the printed pigment and a high strength at a low cost, and a pigment-printed glass sheet in which a pigment is printed on a predetermined glass sheet, etc.

Solution to Problem

As a result of a thorough study to solve the aforementioned problem, the present inventors have found that weathering of the glass which is a problem of house windows occurs also in a cover glass on which a pigment is printed and this may be the reason of the peeling off of the pigment.

The present inventors have studied the composition of a glass sheet which hardly causes the glass weathering and also have studied the composition in which a high strength can be achieved by a chemical strengthening treatment and which does not cost a lot as in an aluminosilicate glass, thereby completing the present invention.

That is, the present invention is as follows.

(1) A glass sheet for pigment printing containing, as represented by mass percentage on the basis of oxides, from 60% to 75% of $SiO_2$, from 2% to 12% of $Al_2O_3$, from 2% to 11% of MgO, from 0% to 10% of CaO, from 0% to 3% of SrO, from 0% to 3% of BaO, from 10% to 18% of $Na_2O$, from 0% to 8% of $K_2O$, and from 0% to 4% of $ZrO_2$.

(2) The glass sheet for pigment printing according to (1), having the content of $Al_2O_3$ of from 3% to 12%.

(3) The glass sheet for pigment printing according to (2), having a mass ratio (CaO/MgO) of the CaO to the MgO of from 0.05 to 2.2.

(4) The glass sheet for pigment printing according to (1), having the content of $Al_2O_3$ of from 2% to 3.6% and a mass ratio (CaO/MgO) of the CaO to the MgO of from 0 to 0.75.

(5) A glass sheet for pigment printing containing, as represented by mass percentage on the basis of oxides, from 60% to 75% of $SiO_2$, from 1.5% to 12% of $Al_2O_3$, from 6% to 12% of MgO, from 0% to 4.5% of CaO, from 0% to 3% of SrO, from 0% to 3% of BaO, from 10% to 18% of $Na_2O$, from 0% to 8% of $K_2O$, and from 0% to 4% of $ZrO_2$.

(6) The glass sheet for pigment printing according to (5), having the content of $Al_2O_3$ of from 1.5% to 3% and a mass ratio (CaO/MgO) of CaO to MgO of from 0 to 0.67.

(7) The glass sheet for pigment printing according to any one of (1) to (6), which has been subjected to a chemical strengthening treatment.

(8) The glass sheet for pigment printing according to any one of (1) to (7), which has been formed by a float process.

(9) A pigment-printed glass sheet, including a glass substrate containing, as represented by mass percentage on the basis of oxides, from 2% to 12% of $Al_2O_3$, the glass substrate having a pigment being printed on at least one surface thereof.

(10) A pigment-printed glass sheet, including a glass substrate containing, as represented by mass percentage on the basis of oxides, from 3% to 12% of $Al_2O_3$, the glass substrate having a pigment being printed on at least one surface thereof.

(11) The pigment-printed glass sheet according to (9) or (10), in which the glass substrate further contains, as represented by mass percentage on the basis of oxides, from 60% to 75% of $SiO_2$, from 2% to 11% of MgO, from 0% to 10% of CaO, from 0% to 3% of SrO, from 0% to 3% of BaO, from 10% to 18% of $Na_2O$, from 0% to 8% of $K_2O$, and from 0% to 4% of $ZrO_2$.

(12) The pigment-printed glass sheet according to any one of (9) to (11), in which the glass substrate has the content of $Al_2O_3$ of from 3% to 12% and a mass ratio (CaO/MgO) of CaO to MgO of from 0.05 to 2.2.

(13) The pigment-printed glass sheet according to (9) or (11), in which the glass substrate has the content of $Al_2O_3$ of from 2% to 3.6% and a mass ratio (CaO/MgO) of CaO to MgO of from 0 to 0.75.

(14) A pigment-printed glass sheet, including a glass substrate containing, as represented by mass percentage on the basis of oxides, from 60% to 75% of $SiO_2$, from 1.5% to 12% of $Al_2O_3$, from 6% to 12% of MgO, from 0% to 4.5% of CaO, from 0% to 3% of SrO, from 0% to 3% of BaO, from 10% to 18% of $Na_2O$, from 0% to 8% of $K_2O$, and from 0% to 4% of $ZrO_2$, the glass substrate having a pigment being printed on at least one surface thereof.

(15) The pigment-printed glass sheet according to (14), in which the glass substrate has the content of $Al_2O_3$ of from 1.5% to 3% and a mass ratio (CaO/MgO) of the CaO to the MgO of from 0 to 0.67.

(16) The pigment-printed glass sheet according to any one of (9) to (15), in which the glass substrate has been subjected to a chemical strengthening treatment.

(17) A method for producing a pigment-printed glass sheet including: a step of preparing the glass sheet for pigment printing according to any one of (1) to (8); and a step of printing a pigment on at least one surface of the glass sheet for pigment printing.

(18) An image display device, including the pigment-printed glass sheet according to any one of (9) to (16).

Advantageous Effects of Invention

According to the present invention, it is possible to provide a glass sheet for pigment printing, which can provide a cover glass having excellent adhesion to the printed pigment and a high strength at a low cost, and a pigment-printed glass sheet in which a pigment is printed on a predetermined glass sheet, etc.

BRIEF DESCRIPTION OF DRAWINGS

FIG. 2 shows results of adhesion tests of strengthened glass sheets of Example 1, Comparative Example 1, and Comparative Example 2 in Examples.

DESCRIPTION OF EMBODIMENTS

Figure 1:
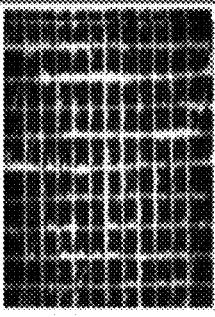
FIG. 1 shows results of adhesion tests of non-strengthened glass sheets of Example 1, Comparative Example 1 and Comparative Example 2 in Examples.

Hereinafter, the glass sheet for pigment printing, the pigment-printed glass sheet, the method for producing a pigment-printed glass sheet, and an image display device of the present invention will be described in detail.

[Glass Sheet for Pigment Printing]

As described above, the present inventors have investigated the reason of the peeling off of a printed pigment from a glass sheet. They printed the pigment on the glass substrate having various compositions, evaluated adhesion of the printed pigment to the substrate, and found that bond strength between the pigment and the glass becomes strong by setting the glass composition within a certain range.

Specifically, the glass sheet for pigment printing of the present invention contains, as represented by mass percentage on the basis of oxides, from 60% to 75% of $SiO_2$, from 2% to 12% of $Al_2O_3$, from 2% to 11% of MgO, from 0% to 10% of CaO, from 0% to 3% of SrO, from 0% to 3% of BaO, from 10% to 18% of $Na_2O$, from 0% to 8% of $K_2O$, and from 0% to 4% of $ZrO_2$ (the total of the above components is 100% or less and normally 95% or more).

In addition, another aspect of the glass sheet for pigment printing of the present invention contains, as represented by mass percentage on the basis of oxides, from 60% to 75% of $SiO_2$, from 1.5% to 12% $Al_2O_3$, from 6% to 12% of MgO, from 0% to 4.5% of CaO, from 0% to 3% of SrO, from 0% to 3% of BaO, from 10% to 18% of $Na_2O$, from 0% to 8% of $K_2O$, and from 0% to 4% of $ZrO_2$ (the total of the above components is 100% or less and normally 95% or more).

In below, a reason why the composition of the glass sheet for pigment printing of the present invention is limited to the aforementioned range will be described. Also, in the present specification, the content of each constituent component (essential components of the present invention and optional components described below) in the glass sheet for pigment printing of the present invention and the pigment-printed glass sheet described below is represented by mass percentage on the basis of oxides and they can be obtained by fluorescent X-ray analysis and wet analysis such as an ICP emission spectrometry, an atomic absorption spectrometry, and titrimetry.

<Glass Composition>

($SiO_2$: 60% to 75%)

$SiO_2$ is known as a component for forming a network structure in a glass microstructure and is a major component configuring a glass. In the glass sheet for pigment printing of the present invention, the content of $SiO_2$ is 60% or more, preferably 63% or more, more preferably 65% or more, and still more preferably 67% or more. In addition, the content of $SiO_2$ is 75% or less, preferably 73% or less, and more preferably 71% or less.

If the content of $SiO_2$ is less than 60%, stability and weather resistance as a glass cannot be secured, and on the other hand, if the content of $SiO_2$ is more than 75%, melting properties and formability of the glass in the step of producing a glass sheet for pigment printing become insufficient.

($Al_2O_3$: 2% to 12% or 1.5% to 12%)

$Al_2O_3$ has an action of increasing adhesion of a pigment print to a glass sheet by preventing a weathering of the glass and suppressing the print from being peeled off from the glass sheet. Also, it has an action of enhancing ion exchange performance in the chemical strengthening treatment and known as a component for enhancing weather resistance of the glass sheet.

The content of $Al_2O_3$ in the glass sheet for pigment printing of the present invention is 2% or more, preferably 3% or more, more preferably 3.6% or more, still more preferably 4.2% or more, and particularly preferably 4.6% or more. In addition, the content of $Al_2O_3$ is 12% or less, preferably 9% or less, more preferably 8% or less, and still more preferably 7% or less.

If the content of $Al_2O_3$ is less than 2%, it is not possible to suppress the peeling off of the pigment and an increase in the strength due to the chemical strengthening treatment is insufficient. On the other hand, if the content of $Al_2O_3$ is more than 12%, viscosity at high temperature and devitrification temperature of the glass are increased in producing a glass sheet for pigment printing, and melting properties and formability of the glass in a soda-lime glass production line are deteriorated, which leads to an increase in a production cost of the glass sheet.

The content of $Al_2O_3$ according to another aspect of the glass sheet for pigment printing of the present invention is 1.5% or more, preferably 1.8% or more, and still more preferably 2% or more. When the content of MgO is 6% or more and the content of CaO is 4.5% or less in the glass sheet, even if the content of $Al_2O_3$ is smaller, it is possible to suppress the peeling off of the pigment.

(MgO: 2% to 11% or 6% to 12%)

MgO is an effective component for increasing adhesion of a pigment print to a glass sheet by preventing a weathering of the glass and suppressing the print from being peeled off from the glass sheet and is an essential component in the present invention. In addition, MgO has an effect of promoting ion exchange in the chemical strengthening treatment and increasing the DOL compared to other alkaline earth oxides.

The content of MgO in the glass sheet for pigment printing of the present invention is 2% or more, preferably 3% or more, and more preferably 3.6% or more. In addition, the content of MgO is 11% or less, preferably 10% or less, and more preferably 9% or less. If the content of MgO is less than 2%, it is not possible to effectively prevent the peeling off of the pigment. On the other hand, if the content of MgO is more than 11%, devitrification temperature in melting the glass is increased.

The content of MgO according to another aspect of the glass sheet for pigment printing of the present invention is 6% or more, preferably 7% or more, and more preferably 8% or more. The content of MgO in this case is 12% or less and preferably 11% or less.

If the content of MgO in the glass sheet is 6% or more, even if the content of $Al_2O_3$ is smaller, it is possible to suppress the peeling off of the pigment. In addition, if MgO is 12% or less, it is possible to suppress an increase in devitrification temperature by adjusting the composition of other components such as $Al_2O_3$.

(CaO: 0% to 10% or 0% to 4.5%)

CaO is a component for stabilizing a glass and enhances chemical resistance. For example, in an environment of high humidity in which a window glass of a house or a transportation machine can be used, the CaO component is precipitated as calcium carbonate on the glass surface and forms a deteriorated layer which is referred to as so-called cloudy weathering. On the other hand, CaO also has an action of preventing $Na^+$ ion, which is a greater cause of the glass weathering, from being precipitated as sodium carbonate.

In the present invention, CaO is not an essential component but in the case where it is contained in the glass sheet for pigment printing, an action is strongly shown, which suppresses the peeling off of the pigment by preventing the weathering caused by sodium carbonate generated in combination with other components, rather than the action of CaO itself becoming the cloudy weathering.

In order to enhance chemical resistance of the glass sheet for pigment printing of the present invention, the content of CaO is preferably 0.5% or more, more preferably 1% or more, still more preferably 2% or more, and particularly preferably 3% or more. In addition, from a viewpoint of suppressing the peeling off of the pigment because of CaO itself becoming the cloudy weathering, the content of CaO is 10% or less, preferably 8% or less, more preferably 6% or less, and still more preferably 3.5% or less.

The content of CaO according to another aspect of the glass sheet for pigment printing of the present invention is 4.5% or less, preferably 4% or less, more preferably 3.5% or less, and still more preferably 3% or less. If the content of CaO in the glass sheet is 4.5% or less, even if the content of $Al_2O_3$ is smaller, it is possible to suppress the peeling off of the pigment.

(SrO: 0% to 3%)

SrO is not essential in the glass sheet for pigment printing of the present invention, but has an action of suppressing the peeling off of the pigment by preventing the cloudy weathering, decreasing viscosity at high temperature of the glass, and decreasing devitrification temperature, etc. In addition, SrO has an action of preventing the cloudy weathering, but SrO itself also tends to be precipitated on the surface of the glass sheet as strontium carbonate. Thus, in order to suppress the peeling off of the printed pigment, the content thereof is preferably not great. In the present invention, the content of SrO in the case of being contained in the glass sheet for pigment printing is 3% or less, preferably 2% or less, and more preferably 1% or less.

(BaO: 0% to 3%)

BaO is not essential in the glass sheet for pigment printing of the present invention, but has an action of suppressing the peeling off of the pigment by preventing the cloudy weathering, decreasing viscosity at high temperature of the glass, and decreasing devitrification temperature. In addition, since BaO has an action of increasing a specific gravity of the glass, in the case where a light weight of the glass is intended, it is preferably not contained. In the present invention, the content of BaO in the case of being contained in the glass sheet for pigment printing is 3% or less, preferably 2% or less, and more preferably 1% or less.

($Na_2O$: 10% to 18%)

$Na_2O$ is a component for decreasing viscosity at high temperature and devitrification temperature of the glass effectively and enhancing melting properties and formability of the glass, and is an essential constituent component in the glass sheet for pigment printing of the present invention. The cover glass is normally subjected to the chemical strengthening treatment, and $Na_2O$ is a necessary component for forming a surface compressive stress layer by ion exchange in this treatment.

For example, in an environment of high temperature and high humidity in which a window glass of a house or a transportation machine can be used, $Na^+$ ion leaches out from the glass surface to form a deteriorated layer which is referred to as so-called iridescence weathering on the glass surface. In the cover glass, since the pigment is printed on the surface, to be incorporated into an information terminal, of the cover glass and substantially shielded from air, it is not considered that the weathering is generated.

According to the study of the present inventors here, it is considered that the weathering is generated even in the cover glass, $Na^+$ ion which leached out from the glass reacts with the pigment, and adhesion of the pigment to the glass sheet is decreased, which causes the peeling off of the pigment.

The content of $Na_2O$ having both the advantage and disadvantage in the glass sheet for pigment printing of the present invention is 10% or more, preferably 12% or more, and more preferably 13% or more. In addition, the content of $Na_2O$ is 18% or less, preferably 17% or less, and more preferably 16% or less.

If the content of $Na_2O$ is less than 10%, viscosity at high temperature and devitrification temperature of the glass are high, which is an unsuitable state for producing the glass sheet, and it is not possible to form a desired surface compressive stress layer on the surface of the glass sheet by ion exchange. On the other hand, if the content of $Na_2O$ is more than 18%, the printed pigment is likely to be peeled off.

($K_2O$: 0% to 8%)

$K_2O$ is not essential in the glass sheet for pigment printing of the present invention, but may be contained since it has an effect of suppressing movement of $Na^+$ ion in the glass and preventing the peeling off of the pigment. On the other hand, if the content of $K_2O$ is too great, ion exchange efficiency is deteriorated and strength in the chemical strengthening treatment is less enhanced. Also, the thermal expansion coefficient of the glass becomes great and accordingly, a difference in expansion coefficient between the printed pigment on the surface and the glass sheet becomes great and the pigment is likely to be peeled off from the glass sheet.

From the above viewpoint, the content of $K_2O$ in the case of being contained in the glass sheet for pigment printing of the present invention is 8% or less, preferably 6% or less, and more preferably 4% or less. In order to suppress the peeling off of the pigment from the glass sheet at the time when the pigment is heated and cured, the content of $K_2O$ is preferably 2% or less, more preferably 1% or less, and still more preferably 0.5% or less.

($ZrO_2$: 0% to 4%)

$ZrO_2$ is not essential in the glass sheet for pigment printing of the present invention, but, in general, known as a component for enhancing weather resistance of the glass, and is also an effective component for suppressing the peeling off of the pigment. In addition, it is a component for enhancing CS in the chemical strengthening treatment. However, if the content of $ZrO_2$ is too great, striae or defects of an unmelted product or the like are likely to be generated in melting the glass. From the above viewpoint, the content of $ZrO_2$ in the case of being contained in the glass sheet for pigment printing of the present invention is 4% or less and preferably 1% or less.

(Alkaline Earth Metal (RO): 6% to 12%)

The alkaline earth metal (RO) described above, in other words, MgO, CaO, SrO, and BaO are effective components for enhancing weather resistance of the glass, preventing the weathering of the glass, and suppressing the peeling off of the printed pigment from the glass sheet.

In order to effectively prevent the peeling off of the pigment, the total content of RO in the glass sheet for pigment printing of the present invention is normally 6% or more, preferably 7% or more, and more preferably 8% or more. On the other hand, since RO is a component which inhibits movement of an alkali ion in the glass, and from a viewpoint of effectively executing the chemical strengthening treatment of the glass, the total content of RO is normally 12% or less, preferably 11.3% or less, and more preferably 10.6% or less.

[Mass Ratio of CaO to MgO (CaO/MgO)]

In addition, in the glass sheet for pigment printing of the present invention, the ratio of CaO to MgO is also important for suppressing the peeling off of the pigment by preventing the weathering, and increasing the ratio of MgO is effective in preventing the weathering.

From the above viewpoint, the mass ratio (CaO/MgO) of CaO to MgO in the glass sheet is preferably 0.05 to 2.2, more preferably 0.05 to 1.0, and still more preferably 0.1 to 0.4. In the case where the content of $Al_2O_3$ is 3% to 12%, this mass ratio is preferable.

In the case where the content of $Al_2O_3$ (having an action of preventing the weathering of the glass as described above) in the glass sheet is relatively low, which is 2% to 3.6%, in order to sufficiently prevent the weathering by using components other than the $Al_2O_3$, the mass ratio of CaO to MgO is preferably 0 to 0.75.

From the same viewpoint, according to another aspect of the glass sheet for pigment printing of the present invention, when the content of $Al_2O_3$ is 1.5% to 3%, the mass ratio of CaO to MgO is preferably 0 to 0.67.

($Al_2O_3$, MgO and CaO)

In the present invention, as described above, $Al_2O_3$, MgO and CaO are important components for increasing the strength by the chemical strengthening treatment and preventing the weathering. A combination of the preferable content of these components and the mass ratio of CaO/MgO in the glass sheet for pigment printing of the present invention is as follows.

TABLE 1

|  | $Al_2O_3$ | CaO | MgO | CaO/MgO |
| --- | --- | --- | --- | --- |
| Preferred ratio 1 | 2-3.6% | 0-4.5% | 6-11% | 0-0.75 |
| Preferred ratio 2 | 3-7% | 0.5-6.5% | 4-10% | 0.05-1.6 |
| Preferred ratio 3 | 4-10% | 1-8% | 3.6-9% | 0.11-2.2 |
| Preferred ratio 4 | 4.7-12% | 3-9% | 2.5-8% | 0.38-3.6 |
| Preferred ratio 5 | 1.5-3% | 0-4% | 6-12% | 0-0.67 |

<Other Constituent Components>

The glass sheet for pigment printing of the present invention fundamentally contains the above-described components, but may contain other components described below within the range not impairing the object of the present invention. In the case where the glass sheet contains such components, the total content of these components is preferably 5% or less (as represented by mass percentage on the basis of oxides), more preferably 3% or less, and still more preferably 1% or less.

In addition to other components described below, it is needless to say that other metal components which are commonly used in the field of glass sheets, or various unavoidable impurities which may be mixed in under an environment where the glass sheet is produced may be contained in the glass sheet for pigment printing of the present invention.

($SO_3$)

$SO_3$ is a fining agent of the molten glass. Non tally, the content thereof in the glass sheet is equal to or less than the half of the amount to be input from a raw material. The content of $SO_3$ in the glass sheet for pigment printing of the present invention is normally 0.02% or more, preferably 0.05% or more, and more preferably 0.1% or more. In addition, the content of $SO_3$ is normally 0.4% or less, preferably 0.35% or less, and more preferably 0.3% or less.

If the content of $SO_3$ is 0.02% or more, sufficient fining and suppression of bubble defects are possible. On the other hand, if the content of $SO_3$ is 0.4% or less, it is possible to suppress a defect of sodium sulfate generated in the glass.

(F and Cl)

Other than the above, the glass sheet for pigment printing of the present invention may contain F and Cl as gas components having a fining action. In the case where these components are contained, the content thereof is 1% or less in total.

($Fe_2O_3$)

$Fe_2O_3$ is such a component that, since it exists everywhere in a natural world and a production line, it is extremely difficult to set the content thereof to be zero. The content of $Fe_2O_3$ in the glass sheet for pigment printing of the present invention is typically 0.005% or more.

It is known that $Fe_2O_3$ in an oxidized state causes yellow coloring and FeO in a reduced state causes blue coloring, and it is known that a balance in both components makes the glass to be colored in green.

When the glass is printed with a white pigment, the content of $Fe_2O_3$ is preferably set to low in order to suppress coloring of the glass. The content of $Fe_2O_3$ in the glass sheet is normally 0.2% or less, preferably 0.15% or less, more preferably 0.1% or less, and particularly preferably 0.05% or less.

($TiO_2$)

It is known that $TiO_2$ exists in a large amount in a natural raw material of the glass and causes yellow coloring. In the case where a white pigment is printed on the glass sheet for pigment printing of the present invention, the content of $TiO_2$ is preferably suppressed to be low. From the above viewpoints, the content of $TiO_2$ in the glass sheet is normally 0.2% or less, preferably 0.1% or less, and more preferably 0.05% or less.

(ZnO)

ZnO has an action of enhancing melting properties of the glass at high temperature and, for example, may be contained up to 2% in the glass sheet for pigment printing of the present invention. However, in the case where the glass sheet is produced by a float process, ZnO is reduced in a float bath, which becomes a product defect, and accordingly, ZnO is preferably not contained.

($B_2O_3$)

$B_2O_3$ is a component for enhancing melting properties of the glass at high temperature or the glass strength, and may be contained in the range of less than 1% in the glass sheet for pigment printing of the present invention. In general, if an alkali component such as $Na_2O$ or $K_2O$ and $B_2O_3$ are contained together, volatilization becomes severe and bricks of the melting tank are remarkably eroded and accordingly, it is preferable that the glass sheet substantially does not contain $B_2O_3$.

($Li_2O$)

$Li_2O$ is a component which lowers a strain point of the glass and tends to cause stress relaxation, and as a result, causes a stabilized surface compressive stress layer not to be easily obtained. Thus, the component is preferably not contained in the glass sheet for pigment printing of the present invention, and even in the case of being contained, the content thereof is preferably less than 1%, more preferably less than 0.05%, and particularly preferably less than 0.01%.

<Glass Sheet for Pigment Printing>

The glass sheet for pigment printing of the present invention has the aforementioned composition. If a pigment is printed, since adhesion between the pigment and the glass sheet is excellent, the pigment is unlikely to be peeled off from the glass sheet, the strength can be considerably increased by the chemical strengthening treatment, and the glass sheet can be produced at a low cost and thus the price thereof can be low. The reason therefor is as follows.

By preparing glass sheets having a different composition, printing a pigment on these glass sheets, and evaluating adhesion (bond strength) between the glass sheets and the pigment, the present inventors found that the glass composition and the bond strength of the pigment are correlated to each other and in particular, the glass weathering and the peeling off of the pigment are correlated to each other.

When the glass is stored for a long period of time or exposed to a high temperature and high humidity environment, the surface thereof is deteriorated. The glass weathering is a problem particular in a window glass of a house and the like and a phenomenon in which the surface becomes cloudy in white is known as a cloudy weathering. The cloudy weathering of the glass is generated when a calcium component in the glass leaches out and adheres to the surface as calcium carbonate.

In addition, a phenomenon in which an interference color appears in light reflected on the glass surface is known as an iridescence weathering, and it is generated when a sodium component in the glass leaches out and a refractive index is changed in the vicinity of the surface layer. A part of the components in the glass leaches out from the surface and an optical change is thereby caused, and consequently the cloudy weathering and the iridescence weathering are generated.

The present inventors found that in the glass having a composition in which the weathering is unlikely to be generated, the printed pigment is unlikely to be peeled off, and in the glass having a composition in which the weathering is likely to be generated, the printed pigment is likely to be peeled off. The glass weathering has a correlation with the glass composition and an effect of preventing the weathering is exhibited if $Al_2O_3$ in the glass is increased. In addition, it is effective to prevent the weathering by increasing the proportion of MgO in the ratio of CaO to MgO and the preferable range thereof is as described above.

It is considered that the reason for the enhanced bond strength of the printed pigment in the glass in which the weathering is unlikely to be generated is as follows. The peeling off of the pigment occurs because a component such as sodium in the glass is diffused in the pigment and the pigment is deteriorated. In the glass in which the weathering is unlikely to be generated, it is considered that a component such as sodium is unlikely to be leached out from the glass, and accordingly, the pigment is unlikely to be deteriorated, and the bond strength between the pigment and the glass is strongly maintained.

As described above, since the glass sheet for pigment printing of the present invention contains components such as $Al_2O_3$ and MgO, which increase an effect of enhancing the strength by the chemical strengthening treatment, it is possible to achieve excellent strength by subjecting it to the chemical strengthening treatment.

If the content of $Al_2O_3$ is high, viscosity of the molten glass in producing a glass sheet is increased and it is necessary to increase a melting temperature. Thus, the production cost is increased and the glass sheet product becomes expensive.

In the present invention, the content of $Al_2O_3$ is suppressed to the extent in which viscosity of the molten glass does not become problematically high and accordingly, production at a low cost which is the production cost close to that of a normal soda-lime glass is possible.

Next, the properties of the glass sheet for pigment printing of the present invention will be described. In addition, the strength of the glass sheet will be described in the section of chemical strengthening treatment described later.

(Thermal Expansion Coefficient)

The thermal expansion coefficient of a normal soda-lime glass is generally from $85 \times 10^{-7}$ to $94 \times 10^{-7\circ}$ $C.^{-1}$ in the temperature range of 50° C. to 350° C. In the glass on which the pigment is to be printed, in order to, for example, prevent a stress from being generated due to mismatch of the thermal expansion coefficient with other members used for the image display device, it is demanded that the thermal expansion coefficient is not greatly varied from a conventional value.

Therefore, the thermal expansion coefficient of the glass sheet for pigment printing of the present invention is preferably $83 \times 10^{-7}$ to $101 \times 10^{-7\circ}$ $C.^{-1}$ and more preferably $85 \times 10^{-7}$ to $95 \times 10^{-7\circ}$ $C.^{-1}$. In addition, the thermal expansion coefficient in the present specification is a numerical value obtained as an average linear thermal expansion coefficient at 50° C. to 350° C.

<Method for Producing a Glass Sheet for Pigment Printing>

Next, the method for producing the glass sheet for pigment printing of the present invention will be described.

(Production of a Glass Sheet)

The glass sheet for pigment printing can be produced such that a glass raw material is put into a melting tank so as to achieve a composition of the glass sheet, the raw material is heated and melted, the obtained molten glass is fined (defoamed) as necessary, and then the molten glass is formed and cooled in a flat plate shape according to a well-known glass forming method such as a float process, a fusion process, a roll-out process, and a slot down draw process.

The chemical strengthening treatment described below or the like can be executed with respect to the produced glass sheet for pigment printing. In the present invention, from a viewpoint of mass production and production cost of the glass sheet, a float process is appropriate among the glass forming processes.

The glass having the aforementioned composition, which is the glass sheet for pigment printing of the present invention formed by the glass forming processes, has the following properties.

[$T_2$ (Temperature of Log $\eta=2$)]

It is preferable that the glass can be easily changed from a normal soda-lime glass produced in a float furnace from a viewpoint of both production properties and product properties. In a normal soda-lime glass, the temperature $T_2$ of log $\eta=2$ which is a standard of viscosity at high temperature in melting the glass is generally from 1445° C. to 1475° C.

If the increase in $T_2$ is in the range of up to about plus 50° C. relative to the above range, the glass sheet for pigment printing of the present invention can be produced in a production furnace where the normal soda-lime glass has been melted. Accordingly, $T_2$ of the glass is preferably 1520° C. or lower and more preferably 1505° C. or lower.

[$T_4$ (Temperature of Log $\eta=4$)]

In a normal soda-lime glass, the temperature $T_4$ of log $\eta=4$ which is another standard of viscosity at high temperature in forming the glass according to the float process is generally from 1020° C. to 1050° C. If the increase in $T_4$ is in the range of up to about plus 40° C. relative to the above range, the glass sheet for pigment printing of the present invention can be easily produced in a production furnace where the normal soda-lime glass has been formed. With regard to the viscosity at high temperature in forming the glass sheet, $T_4$ is preferably 1090° C. or lower and more preferably 1075° C. or lower.

(Devitrification Temperature)

When the glass is produced according to the float process, a risk of the generation of devitrification is determined by comparing the aforementioned $T_4$ and devitrification temperature. In general, if the devitrification temperature of the glass is equal to or lower than the temperature which is 15° C. higher than $T_4$, the glass sheet can be produced without generating devitrification according to the float process. From the same viewpoint, the devitrification temperature of the glass is preferably $T_4$ or lower and more preferably the temperature which is lower than $T_4$ of about 10° C. or more.

(Specific Gravity)

The specific gravity of a normal soda-lime glass is 2.480 to 2.505 at room temperature (25° C.). In consideration of that the glass sheet for pigment printing of the present invention and the normal soda-lime glass are produced in the same furnace alternatively, if a variation of the specific gravity between these glasses is 0.030 or less, a composition change at the time of changing the glass to be produced is easily performed. That is, the specific gravity of the glass sheet for pigment printing of the present invention is preferably 2.450 to 2.535.

(Strain Point and Glass Transition Temperature Tg)

As described below, the chemical strengthening treatment is executed with respect to the glass sheet for pigment printing of the present invention, and the low temperature type ion exchange method is preferably adopted as the chemical strengthening treatment. In this treatment, an effective treatment temperature can be determined based on the strain point of the glass. In general, the low temperature type ion exchange method is executed at the temperature which is 50° C. to 100° C. lower than the strain point. The strain point of a normal soda-lime glass is 490° C. to 520° C.

As the chemical strengthening treatment of the glass sheet for pigment printing of the present invention, the same low temperature type ion exchange method as performed with respect to a conventional soda-lime glass is preferably applied, and accordingly, the strain point of the glass configuring the glass sheet is preferably 480° C. to 540° C. and more preferably 490° C. to 530° C.

In addition, since a skilled technique is necessary for measuring the strain point, the thermal expansion coefficient of the glass sheet is measured and then the glass transition temperature Tg is obtained therefrom to be used instead of the strain point. In general, Tg is the temperature higher than the strain point of about 40° C. Thus, Tg of the glass sheet for pigment printing of the present invention is preferably 520° C. to 580° C. and more preferably 530° C. to 570° C.

(Cutting Process)

In the present invention, as described above, the glass sheet for pigment printing is preferably formed by the float process. When the glass sheet is formed by this process, a continuous ribbon-shaped glass sheet having a float forming width is obtained and this is cut into a predetermined shape.

Cutting may be performed so as to obtain the size of a predetermined final product such as a cover glass. In another case, cutting may be performed so as to obtain the predetermined size, in which the chemical strengthening treatment or a pigment printing described below is easily performed, to obtain a blank, then the chemical strengthening treatment is subjected thereto (or the pigment printing described below is further performed), and then cutting may be performed so as to obtain the size of the final product.

As the cutting method, scribing and breaking using a normal wheel tip cutter can be applied and cutting using a laser is also possible. In order to maintain the glass strength, a chamfering process of the cutting edge after the cutting may be executed. Chamfering may be performed by a mechanical grinding process or may be performed by a method of treating with a chemical solution such as hydrofluoric acid.

In addition, examples of the aforementioned final product include portable devices such as a tablet PC and a smart phone, and housings such as a liquid crystal television and a PC monitor. The plane shape of these final products is generally rectangle, but the plane shape of the glass sheet for pigment printing of the present invention is not limited to this, and may be, for example, a circle, oval, and a polygon such as triangle, pentagon and hexagon other than a rectangle.

Further, the glass sheet for pigment printing of the present invention may have a hole portion such as an ear hole or a key operation hole according to the use thereof.

A perforating process or outer peripheral shape process for forming this hole portion may be executed by a mechanical process such as a grinding process or a sand blasting, in addition to a normal wheel cutting or laser cutting, or may be executed by a chemical process such as etching.

Further, the glass sheet for pigment printing of the present invention may be a flat plate shape or may be a curved plate which has been subjected to a predetermined process. Furthermore, the plate surface may be smooth or may have unevenness formed thereon by such as an antiglare treatment.

(Chemical Strengthening Treatment)

The chemical strengthening treatment is normally executed with respect to the glass sheet for pigment printing of the present invention. The chemical strengthening treatment can be performed by a conventionally known method, for example, a low temperature type ion exchange method, a high temperature type ion exchange method, a surface crystallization method, or a dealkalization method. In the present invention, the low temperature type ion exchange method is appropriate, in which $Na^+$ ion in the glass sheet and $K^+$ ion in the molten salt are exchanged by, for example, immersing the glass sheet in a melt of potassium nitrate salts, to form a compressive stress layer on the surface of the glass sheet.

The low temperature type ion exchange method can be performed by, for example, immersing the glass sheet in potassium nitrate molten salt having a temperature of 340° C. to 550° C. for 5 minutes to 20 hours. Examples of the molten salt for performing the ion exchange treatment include alkali nitrate salts such as potassium nitrate salt and alkali chloride salts such as potassium chloride salt. These molten salts may be used alone or a plurality thereof may be used in combination. In addition, in order to adjust chemical strengthening properties, salts including sodium may be mixed in the molten salt.

In the present invention, the treatment condition of the chemical strengthening treatment including the low temperature type ion exchange method described above is not particularly limited, and the optimal condition may be selected in consideration of the properties of the glass sheet for pigment printing, molten salt, and the like.

By subjecting the glass sheet for pigment printing of the present invention to the chemical strengthening treatment, the compressive stress layer is formed on the surface thereof. As described above, since the glass sheet contains $Al_2O_3$ or MgO in a predetermined composition in which a enhancing effect of the strength caused by the chemical strengthening treatment is considerably represented, CS of the surface compressive stress layer is normally 600 MPa or more, preferably 650 MPa or more, and more preferably 700 MPa or more (In addition, CS is normally 900 MPa or less). In addition, the CS value can be measured by using a surface stress meter (for example, FSM-6000 manufactured by Orihara Industrial Co., LTD.).

In addition, a scratch to the depth exceeding that of the surface compressive stress layer is formed during using the glass sheet, which has been subjected to the chemical strengthening treatment, it leads to breakage of the glass sheet, and accordingly, the surface compressive stress layer is preferably deep. In other words, the DOL of the glass sheet for pigment printing of the present invention which has been subjected to the chemical strengthening treatment is normally 8 μm or more, preferably 10 μm or more, and more preferably 12 μm or more. In addition, in order to enable the glass sheet after the chemical strengthening treatment to be cut, the DOL is preferably 30 μm or less and more preferably 20 μm or less. Also, the DOL value can be measured by using a surface stress meter (for example, FSM-6000 manufactured by Orihara Industrial Co., LTD.).

Execution of the chemical strengthening treatment not only enhances the strength of the glass sheet for pigment printing of the present invention, but also causes the weathering to be unlikely to be generated and the peeling off of the pigment to be suppressed. Weathering resistance can be evaluated, specifically, such that the glass sheet for pigment printing of the present invention which has not been subjected to the chemical strengthening treatment is cut into 50 mm×50 mm, this is immersed in molten salt of potassium nitrate at a temperature of 420° C. for 150 minutes to be chemically strengthened, the obtained glass sample is cleaned and then put into a thermohygrostat chamber having a temperature of 60° C. and a humidity of 95% to be exposed in a high temperature and high humidity environment for 240 hours, and then the glass sample is taken out from the thermohygrostat chamber to measure haze.

In the glass sheet for pigment printing of the present invention, the haze measured by a haze meter (HAZE COMPUTER HZ-2 manufactured by Suga Test Instruments Co., Ltd.) is preferably 5.0% or less, more preferably 3.0% or less, and still more preferably 2.0% or less.

As described above, the glass sheet for pigment printing of the present invention can be cut before the chemical strengthening treatment, and can be cut after the treatment or after the pigment is further printed as described below. It used to be technically difficult to cut the glass sheet which has been subjected to the chemical strengthening treatment, but in the present, a method for cutting such a glass sheet is developed and the method can be adopted in the present invention without any problems.

The glass sheet for pigment printing of the present invention may be subjected to polishing or etching in order to remove the scratch on the surface, or may be subjected to chemical solution treatment or coating in order to execute an antiglare treatment, an antireflection treatment, or an antibacterial treatment on the surface. These treatments may be performed in any steps before or after the chemical strengthening treatment and printing the pigment.

[Pigment-Printed Glass Sheet]

Next, the pigment-printed glass sheet of the present invention will be described. The pigment-printed glass sheet is obtained by printing a pigment on at least one surface of a predetermined glass substrate. As described above, the glass sheet for pigment printing of the present invention has a predetermined composition, can be considerably increased in the strength thereof by the chemical strengthening treatment, and can be produced at a low cost. Also, in the case where a pigment is printed on the glass sheet for pigment printing of the present invention, adhesion between the pigment and the glass substrate is high and the pigment is unlikely to be peeled off. Thus, it can be suitably adopted as the glass substrate.

In addition, from a viewpoint of achieving an object of suppressing the peeling off of the pigment, the glass substrate configuring the pigment-printed glass sheet may contain 2% to 12% of $Al_2O_3$ and preferably contains 3% to 12%. As another preferred aspect of the pigment-printed glass sheet, when the content of MgO is 6% or more and the content of CaO is 4.5% or less in the glass substrate, the glass substrate preferably includes 1.5% to 12% of $Al_2O_3$. Also, considering other points of strength and the production cost, the glass sheet for pigment printing of the present invention is preferably adopted as the glass substrate.

<Pigment Printing>

Any of inorganic and organic pigments can be used as the pigment to be printed on the glass substrate in the present invention without any limitations.

Examples of the inorganic pigment include zinc oxide, titania, barium sulfate, calcium carbonate, alumina, silica, synthetic smectite, magnesium oxide, titanium black, carbon black, iron oxide, copper-chromium complex oxide, copper-chromium-zinc complex oxide, iron oxide yellow, nickel nitroso yellow, madder lake, copper azomethine yellow, alkali blue, red iron oxide, chromium oxide, titanium yellow, cobalt blue, cerulean blue, cobalt green, viridian, cadmium yellow, cadmium red, lithopone, lead yellow, molybdate orange, zinc chromate, calcium sulfate, white lead, ultramarine blue, manganese violet, cobalt violet, emerald green, Prussian blue, and metal powders.

Examples of the organic pigment include a monoazo pigment, quinacridone, a bisazo pigment, phthalocyanine green, phthalocyanine blue, cyanine blue, flavanthrone yellow, dianthraquinolyl red, indanthrone blue, thioindigo Bordeaux, perylene orange, perylene scarlet, perylene red 178, perylene maroon, dioxazine violet, isoindolinone yellow, quinophthalone yellow, isoindoline yellow, and vermillion.

The particle diameter of the pigment used in the present invention is not particularly limited and, normally, the average particle diameter is 1 μm or less and preferably about 0.02 to 0.5 μm. Within this range, dispersibility of the pigment is satisfactory, a defect in appearance caused by aggregation of the pigment is prevented, and light shielding properties of the pigment-printed part is excellent. The average particle diameter is a value obtained by measuring by a light diffusing method.

The pigment is normally printed as a pigment composition having additives such as a solvent for dilution, a leveling agent and a defoaming material mixed therein, in order to enhance printing properties on the glass substrate. Also, in order to increase the strength of the coating film, an organic or inorganic binder may be mixed in the composition.

Examples of the solvent for dilution include a polar solvent such as isopropanol and ethanol and a non-polar solvent such as xylene and toluene.

Examples of the leveling agent include polyether modified polydimethyl siloxane and an acrylic copolymer.

Examples of the defoaming material include a silicone-based defoaming material. Examples of the binder include an inorganic binder such as an alkoxysilane crosslinked product and an organic binder such as an acrylic resin and an epoxy resin-based compound.

Color strength of the part where the pigment is printed, or light shielding properties in the case of a black pigment can be adjusted by the film thickness of the coating film, other than the content of the pigment in the pigment coating film.

The pigment-printed glass sheet of the present invention is preferably used as a cover glass of various image display devices. A printing method to a glass substrate, which is to be a cover glass, is generally screen printing, and in the present invention also, this printing is preferably adopted. In addition, in the present invention, other printing methods such as spin coating, flow coating, and gravure coating may be adopted.

Normally, in the screen printing, the glass substrate (preferably the glass sheet for pigment printing of the present invention) is loaded sheet by sheet in a positioning jig which belongs to a screen printing machine to apply a pigment. For example, after the pigment is printed, the glass substrate is detached from the jig, and heating at a temperature of about 60° C. to 150° C. is performed in the case of a thermosetting ink, and curing by irradiation with ultraviolet rays (UV) of designated integrated energy is performed in the case of a UV curable ink.

In addition, the pigment can be applied in an overlapping manner by repeating this operation, and lamination of a plurality of pigment layers as the above enables execution of, for example, logos of a company name and product name, icons such as a touch panel, various sensor windows, screen frame trimming, and press printing of the back surface.

As described above, the glass substrate in which the pigment has been printed may be subjected to a cutting process, and in this case, screen printing is executed at one time on the glass substrate having a large area, followed by cutting to produce many final products such as a cover glass.

Furthermore, as described above, polishing, etching, an antiglare treatment, or the like can be executed with respect to the glass substrate before or after the pigment is printed. In addition to these, an antifinger print treatment or wavelength selective absorption coating such as blue light cut may be executed. These various treatments may be preferably performed on the surface opposite to the pigment-printed surface of the pigment-printed glass sheet or in any steps before or after the pigment is printed.

<Use of Pigment-Printed Glass Sheet>

The pigment-printed glass sheet of the present invention, as described above, is suppressed in the peeling off of the pigment and can be produced at a low cost. In the case where the glass substrate is subjected to the chemical strengthening treatment, the strength is excellent, and accordingly, for example, it is suitable for a cover glass of various image display devices.

Examples of the image display device include portable information devices such as a tablet PC, a notebook computer, a smart phone, and an electronic book reader, electronic devices such as a camera, a game console, and a portable music player, liquid crystal televisions, PC monitors, and instrument panels for automobile.

The pigment-printed glass sheet of the present invention used as a cover glass in these image display devices is, normally, incorporated so that the pigment-printed surface thereof faces the inner side in the image display devices. Thus, since the pigment in the glass sheet is substantially shielded from air, it is considered that the weathering originated from water vapor in the air is not substantially generated.

However, as described above, the pigment is normally used in mixture with a solvent for dilution in printing. Thus, it is considered that sodium in the glass sheet is eluted in this solvent, which makes the pigment deteriorated, decreases adhesion between the pigment and the glass sheet, and the peeling off of the pigment is caused.

The weathering has not been highlighted in the cover glass heretofore, but the present inventors here consider that the weathering phenomenon occurs also in this cover glass and is the cause of the peeling off of the pigment, and they provides a glass sheet for pigment printing and a pigment-printed glass sheet which prevent the weathering effectively and in which enhancement in the strength caused by the chemical strengthening treatment and the production cost are both obtained.

EXAMPLES

Hereinafter, the present invention will be described in more detail by using Examples, but the present invention is not limited to these.

[Evaluation Methods]

In the following Examples and Comparative Examples, various properties are evaluated according to the following methods.

(1) Specific Gravity

The specific gravity was measured by Archimedes's method.

(2) Thermal expansion coefficient

The thermal expansion coefficient was obtained by an average linear thermal expansion coefficient at 50° C. to 350° C. by TMA (ThermoMechanical Analysis).

(3) Glass Transition Temperature (Tg)

The glass transition temperature was measured by TMA.

(4) Strain Point

The strain point was measured by a fiber elongation method.

(5) Viscosity at High Temperature

The temperature ($T_2$) at which viscosity reaches $10^2$ dPa·s (log η=2) and the temperature ($T_4$) at which viscosity reaches $10^4$ dPa·s (log η=4) were measured by using a rotational viscometer.

(6) Devitrification Temperature ($T_L$)

For the devitrification temperature, a glass sample was pulverized into glass particles of about 2 mm by using a mortar, and the glass particles were placed in alignment on a platinum boat and thermally treated in a temperature gradient oven at intervals of 5° C. for 24 hours. The highest temperature value of the glass particles with precipitated crystals was the devitrification temperature.

(7) Surface Compressive Stress (CS) and Depth of Compressive Stress Layer (DOL)

The surface compressive stress and the depth of the compressive stress layer were measured by a surface stress meter FSM-6000 manufactured by Orihara Industrial Co., LTD. The photoelastic constant required for the measurement of the above was measured by a circular plate compression method ("Measurement of Photoelastic Constant of Glass for Chemically Strengthening with Method of Compression on Circular Plate", YOKOTA Ryosuke, Yogyo-kyokai-shi (Journal of the Ceramic Society of Japan), 87[10], 1979, p. 519-522), and a refractive index was measured by using a spectrometer by a minimum deviation angle method.

Example 1, Comparative Example 1 and Comparative Example 2

A glass sheet having a composition as represented by mass percentage on the basis of oxides in the following Table 2 was prepared in a float furnace. Silica sand, soda ash, dolomite, feldspar, and salt cake were used as glass raw materials and charged in the furnace such that the obtained glass composition is as shown in Table 2, followed by melting by natural gas combustion and foaming into a glass ribbon having a thickness of about 0.7 mm in a float bath, thereby obtaining glass sheets of Example 1, Comparative Example 1 and Comparative Example 2.

The composition in Table 2 is an analyzed value using fluorescent X-rays, which is obtained by polishing various glass sheets by 100 μm for the measurement. With respect to the glass sheets of Example 1 and Comparative Example 1, the specific gravity, thermal expansion coefficient, Tg, strain point, viscosity at high temperature ($T_2$ and $T_4$), devitrification temperature ($T_L$), photoelastic constant, and refractive index of the glass sheets were measured. The results are shown together in Table 2.

Furthermore, the glass sheets of Example 1 and Comparative Example 1 were subjected to the chemical strengthening treatment. In this treatment, immersing treatment was performed at a temperature of 420° C. for 150 minutes using potassium nitrate salt as a test reagent. Measurement results of CS and DOL of the treated glass sheets were shown in Table 2.

TABLE 2

| | | Ex. 1 | Comp. Ex. 1 | Comp. Ex. 2 |
|---|---|---|---|---|
| (% by mass) | $SiO_2$ | 68.4 | 72.0 | 72.2 |
| | $Al_2O_3$ | 4.95 | 1.86 | 1.35 |
| | CaO | 7.25 | 7.82 | 7.82 |
| | MgO | 4.10 | 4.69 | 4.49 |
| | $Na_2O$ | 14.6 | 13.0 | 13.8 |
| | $K_2O$ | 0.20 | 0.31 | 0.06 |
| | $TiO_2$ | 0.13 | 0.07 | 0.02 |
| | $Fe_2O_3$ | 0.116 | 0.104 | 0.010 |
| | $SO_3$ | 0.26 | 0.19 | 0.32 |
| | Total | 100.01 | 100.04 | 100.07 |
| | RO | 11.35 | 12.51 | 12.31 |
| CaO/MgO | | 1.77 | 1.67 | 1.74 |
| Specific gravity | | 2.502 | 2.495 | — |
| Thermal expansion coefficient ($10^{-7}$ ° $C.^{-1}$) | | 91 | 88 | — |
| Glass transition temperature (° C.) | | 552 | 553 | — |
| Strain point (° C.) | | 512 | 511 | — |
| $T_2$(° C.) | | 1473 | 1471 | — |
| $T_4$(° C.) | | 1042 | 1039 | — |
| $T_L$(° C.) | | 1025 | 1020 | — |
| Photoelastic constant (nmcm/MPa) | | 27.1 | 27.1 | — |
| Refractive index | | 1.518 | 1.518 | — |
| CS(MPa) | | 799 | 698 | — |
| DOL(μm) | | 8.9 | 7.4 | — |

*RO is the total value of alkaline earth metals.
The same applies to the following.

Comparative Example 1 is a normal soda-lime glass and Comparative Example 2 is a soda-lime glass with high transmittance. As shown in Table 2, it was understood that the glass sheet of Example 1 has almost the same physical properties as those of the glass sheet of the normal soda-lime glass of Comparative Example 1.

Furthermore, it was understood that the chemically strengthened glass sheet of Example 1 has the DOL of 1.5 μm deeper and the enhanced CS of about 100 MPa, compared to the chemically strengthened glass sheet obtained by subjecting the glass sheet of the normal soda-lime glass of Comparative Example 1 to the same chemical strengthening treatment.

Here, highly pure potassium nitrate salt was used for the chemical strengthening treatment. On the other hand, since the same potassium nitrate salt are repetitively used in the industrial production of the glass sheet, a Na component which has come out from the glass by ion exchange is mixed therein about 0.5% to 1.0% by mass.

If the potassium nitrate salt with Na mixed therein is used for chemical strengthening, the CS value is decreased compared to the case where the highly pure potassium nitrate salt was used for chemical strengthening. The CS value in Table 2 is about 100 MPa higher compared to the value obtained by industrially executing the chemical strengthening treatment at the same temperature and for the same time.

[Adhesion Test of Pigment 1]

A pigment was printed on the glass sheet shown in the above Table 2 according to a screen printing method and adhesion of the pigment to the glass was evaluated. The order of printing the pigment on the glass and the evaluation method of adhesion are shown below.

<Preparation of Glass Substrate for a Test>

Some of the glass substrates which had been subjected to the chemical strengthening treatment and others which had not been subjected to the chemical strengthening treatment, of Example 1 and Comparative Examples 1 and 2 shown in Table 2 were prepared, and these were immersed in an alkali cleaning solution whose temperature was adjusted to 60° C. (manufactured by YOKOHAMA OILS & FATS INDUSTRY CO., LTD, SEMI CLEAN KG) for 10 minutes.

The glass substrates were taken out, subjected to rinse treatment with ion exchanged water, and subjected to cleaning treatment using an ultrasonic cleaning machine with ion exchanged water therein for 10 minutes. Thereafter, moisture was removed by dry air to prepare glass substrates for a test.

<Preparation of Pigment Composition>

98% by mass of GLS-HF (black), 1% by mass of a reinforcing material for a GLS GLASS PROMOTER, and 1% by mass of a solvent Z-705 (all are manufactured by Teikoku Printing Inks Mfg. Co., Ltd.) were mixed and stirred to prepare a pigment composition for printing.

<Printing (Preparation of Pigment-Printed Glass Sheet for an Adhesion Test)>

Printing was performed on the glass substrate for a test prepared in the above by a screen printing machine (#300 mesh) using the pigment composition for printing. After the printing, the glass substrate for a test was put into a clean oven, and the pigment composition was heated and cured at 130° C. for 10 minutes to prepare a pigment-printed glass sheet for an adhesion test.

<Adhesion Test>

The pigment-printed glass sheet for an adhesion test prepared in the above was put into a thermohygrostat tester whose atmosphere within a chamber was adjusted to 55° C./95% RH for 72 hours. The glass sheet was taken out and it was confirmed whether the appearance of the pigment-printed film was changed or not by a microscope.

Thereafter, adhesion of the pigment printing to the glass substrate for a test was evaluated by JIS-K5600-5-6 [10×10 with the width of 1 mm, peeling of a cellophane tape (crosscut method)] (1999).

For the adhesion evaluation, the appearance of the adhesion-tested part were evaluated by using a microscope together with the number of peeling off of the square (described as 0/100 if nothing is peeled off), and the peeling width of the cut line part by a cutter was evaluated by using a microscope (the line width at the time of only making the cut line was 45 to 50 μm before the adhesion test).

<Result of Adhesion Test of Non-Strengthened Glass Sheet>

Result of the non-strengthened pigment-printed glass sheet for an adhesion test is shown in the following Table 3 and FIG. 1. As shown in Table 3 and FIG. 1, the result was that in the glass sheet of Example 1, the peeling off of the pigment within the cut line (within the square), which starts from the cut line, was less compared to Comparative Example 1. In Comparative Example 2, a lot of defects were recognized in the square part.

TABLE 3

|  | Ex. 1 | Comp. Ex. 1 | Comp. Ex. 2 |
|---|---|---|---|
| Change in film appearance (Microscope 100 times) | No change | No change | No change |
| Peeling off of crosscut film (Microscope 25 times) | 4/100 | 12/100 | 24/100 |

TABLE 3-continued

|  | Ex. 1 | Comp. Ex. 1 | Comp. Ex. 2 |
|---|---|---|---|
| Crosscut line width (μm) (Microscope 100 times) | 109 | 122 | 149 |

<Result of Adhesion Test of Strengthened Glass Sheet>

Result of the chemically strengthened pigment-printed glass sheet for an adhesion test is shown in the following Table 4 and FIG. 2. As shown in Table 4 and FIG. 2, in the glass sheet of Example 1, the pigment peeling was recognized a little in the vicinity of the cut line but considerably less overall, compared to Comparative Examples 1 and 2. On the other hand, in Comparative Examples 1 and 2, the pigment peeling within the square, which starts from the cut line part, was recognized a lot.

TABLE 4

|  | Ex. 1 | Comp. Ex. 1 | Comp. Ex. 2 |
|---|---|---|---|
| Change in film appearance (Microscope 100 times) | No change | No change | No change |
| Peeling off of crosscut film (Microscope 25 times) | 0/100 | 14/100 | 8/100 |
| Crosscut line width (μm) (Microscope 100 times) | 124 | 149 | 148 |

<Haze Test>

The glass sheets of Example 1 and Comparative Example 1 were cut into 50 mm×50 mm and 6 pieces of each glass sheet were prepared. Among these, 3 pieces each were immersed in potassium nitrate molten salt at a temperature of 420° C. for 150 minutes to be chemically strengthened and the rest 3 pieces each were not chemically strengthened.

After these glass samples were cleaned, they were put into a thermohygrostat chamber having a temperature of 60° C. and humidity of 95% and exposed to a high temperature high humidity environment so as to generate the weathering on the glass surface. The glass samples were taken out periodically and the haze generated in the glass samples was measured by a haze meter (HAZE COMPUTER HZ-2 manufactured by Suga Test Instruments Co., Ltd.). After the exposure test was started, the haze was measured without cleaning the glass samples.

Measurement result is shown in the following Table 5 and FIG. 3. The haze value shown here is an average value of 3 pieces of the glass samples. As shown in Table 5 and FIG. 3, it was understood that when the non-chemically strengthened glasses or the chemically strengthened glasses were compared to each other, the glass sheet of Example 1 is a glass having a haze lower than that of the glass sheet of Comparative Example 1 and is unlikely to generate the weathering.

TABLE 5

| | | Exposure time (hr) | | | | | | | |
|---|---|---|---|---|---|---|---|---|---|
| | | 0 | 22 | 48 | 94 | 164 | 237 | 356 | 426 |
| Example Number | Whether strengthened or not | HAZE [%] | HAZE [%] | HAZE [%] | HAZE [%] | HAZE [%] | HAZE [%] | HAZE [%] | HAZE [%] |
| Ex. 1 | Strengthened | 0.2 | 0.2 | 0.2 | 0.3 | 0.6 | 0.8 | 0.8 | 0.8 |
|  | Non-strengthened | 0.2 | 0.2 | 0.2 | 0.5 | 1.2 | 2.0 | 3.5 | 4.9 |
| Comp. Ex. 1 | Strengthened | 0.2 | 0.2 | 0.2 | 0.5 | 1.2 | 1.5 | 2.8 | 3.5 |
|  | Non-strengthened | 0.2 | 0.2 | 0.2 | 0.5 | 1.2 | 3.1 | 9.2 | 13.1 |

Figure 3:
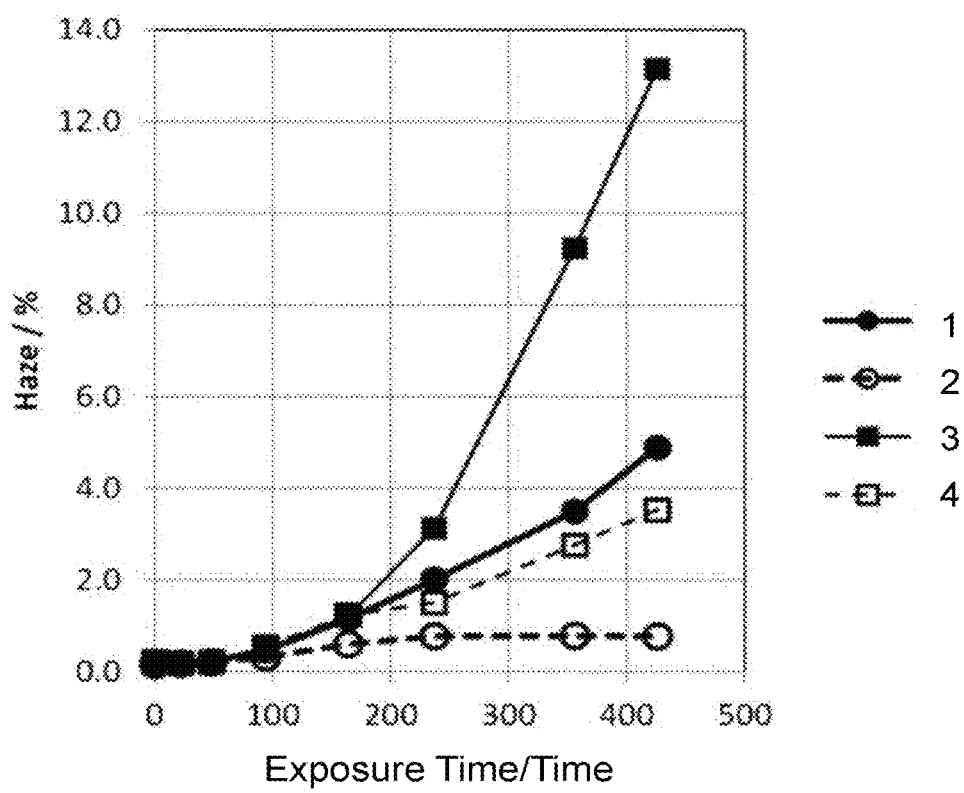
FIG. 3 shows results of Haze tests conducted on glass sheets of Example 1 and Comparative Example 1 in Examples.

As shown in Table 5 and FIG. 3, when compared before and after the chemical strengthening, in any of the glass sheets, it was understood that the haze was low in the chemically strengthened glass sheets and the glasses are unlikely to generate the weathering due to the ion exchange treatment.

From the results of each test described above and the fact that the $Al_2O_3$ amount of the glass sheet of Example 1 is 4.95%, which is higher than the glass sheets of Comparative Examples 1 and 2, it was understood that due to the difference in the $Al_2O_3$ amount, in the glass sheet of Example 1, a surface compressive stress is greatly enhanced by the compressive stress layer formed by the chemical strengthening treatment, the weathering is unlikely to be generated, and the printed pigment is unlikely to be peeled off.

Examples 2 to 10, Comparative Example 3 and Comparative Example 4

The glasses having the compositions of Tables 6 and 7 described below were prepared by crucible melting. Glass raw materials which are generally used such as silica sand, soda ash, dolomite, feldspar, salt cake, other oxides, carbonate salts, and hydroxides were appropriately selected and weighed so as to be 500 g as the glasses having the aforementioned compositions. The weighed raw materials were mixed, put into a crucible made of platinum, followed by putting into a resistance heating type electric furnace having a temperature of 1480° C. to 1500° C. and melting for 3 hours, for defoaming and homogenizing.

The obtained molten glass was casted into a mold material, retained at a temperature of Tg+50° C. for 1 hour, and then cooled at a rate of 0.5° C./min down to room temperature to obtain a glass block. This glass block was cut and ground and finally both surfaces were polished to be mirror surfaces, thereby obtaining a plate-shaped glass having a size of 50 mm×50 mm and a thickness of about 3 mm.

The compositions of Tables 6 and 7 are results obtained by analyzing the compositions by a fluorescent X-ray method. The specific gravity, thermal expansion coefficient, glass transition temperature, viscosity at high temperature, refractive index, and photoelastic constant of Tables 6 and 7 are values obtained by regression calculation from the glass compositions.

Furthermore, the glass sheets described in Tables 6 and 7 were subjected to immersing treatment at a temperature of 420° C. for 150 minutes using potassium nitrate salt as a test reagent to perform the chemical strengthening treatment. The measurement results of CS and DOL of the glass sheet after the treatment are shown in Tables 6 and 7 together.

In all of the glass sheets of Examples, the CS is more than 800 MPa and most of them exceed 900 MPa, and the CS is larger than that of Comparative Examples by 100 MPa or more, and furthermore, the DOL is greater as well.

In addition, the glass sheets of Tables 6 and 7 before the chemical strengthening treatment were polished, and the glass sheets were put into a thermohygrostat chamber having a temperature of 60° C. and humidity of 95% and exposed to a high temperature and high humidity environment for 240 hours so as to generate the weathering on the polished surface thereof. The haze values after the weathering was generated are shown in Tables 6 and 7.

TABLE 6

| | | Ex. 2 | Ex. 3 | Ex. 4 | Ex. 5 | Comp. Ex. 3 | Comp. Ex. 4 |
|---|---|---|---|---|---|---|---|
| (% by mass) | $SiO_2$ | 68.1 | 69.1 | 69.5 | 69.4 | 71.9 | 73.4 |
| | $Al_2O_3$ | 5.08 | 4.60 | 4.61 | 4.80 | 1.81 | 0.69 |
| | CaO | 7.00 | 3.73 | 2.23 | 1.19 | 8.10 | 8.24 |
| | MgO | 4.18 | 7.11 | 8.15 | 9.11 | 4.54 | 4.64 |
| | $Na_2O$ | 15.1 | 14.9 | 15.0 | 15.0 | 13.0 | 12.6 |
| | $K_2O$ | 0.15 | 0.12 | 0.12 | 0.12 | 0.31 | 0.15 |
| | $SO_3$ | 0.31 | 0.28 | 0.25 | 0.23 | 0.27 | 0.27 |
| | $Fe_2O_3$ | 0.094 | 0.090 | 0.091 | 0.093 | 0.097 | 0.015 |
| | $TiO_2$ | 0.04 | 0.03 | 0.04 | 0.04 | 0.06 | 0.04 |
| | Total | 100.0 | 100.0 | 100.0 | 100.0 | 100.0 | 100.0 |
| | RO | 11.2 | 10.8 | 10.4 | 10.3 | 12.6 | 12.9 |
| | CaO/MgO | 1.67 | 0.52 | 0.27 | 0.13 | 1.78 | 1.78 |
| | Specific gravity | 2.500 | 2.471 | 2.458 | 2.452 | 2.486 | 2.478 |
| | Thermal expansion coefficient ($10^{-7}$° $C.^{-1}$) | 92.9 | 88.9 | 87.7 | 86.6 | 88.1 | 86.7 |
| | $T_g$ (° C.) | 557 | 562 | 561 | 565 | 554 | 552 |
| | $T_2$ (° C.) | 1457 | 1478 | 1488 | 1494 | 1457 | 1459 |
| | $T_4$ (° C.) | 1043 | 1062 | 1072 | 1078 | 1043 | 1043 |
| | Haze after exposure in high temperature and high humidity (%) | 2.0 | 2.3 | 1.0 | 1.5 | 13.3 | 52.3 |
| | CS (MPa) | 870 | 900 | 912 | 929 | 755 | 711 |
| | DOL (μm) | 8.4 | 9.7 | 10.7 | 11.3 | 5.8 | 5.6 |
| | Refractive index | 1.518 | 1.512 | 1.510 | 1.508 | 1.518 | 1.513 |
| | Photoelastic constant (nmcm/MPa) | 27.1 | 27.3 | 27.5 | 27.7 | 27.1 | 27.0 |

TABLE 7

| | | Ex. 6 | Ex. 7 | Ex. 8 | Ex. 9 | Ex. 10 |
|---|---|---|---|---|---|---|
| (% by mass) | $SiO_2$ | 66.5 | 66.9 | 67.9 | 63.6 | 64.9 |
| | $Al_2O_3$ | 5.54 | 6.79 | 5.82 | 7.71 | 5.96 |
| | CaO | 1.02 | 2.01 | 1.01 | 2.23 | 3.20 |
| | MgO | 7.25 | 7.84 | 8.78 | 5.85 | 5.31 |
| | SrO | 0.020 | 0.020 | 0.020 | 0.230 | 2.380 |
| | $ZrO_2$ | 2.72 | <0.01 | <0.01 | 1.94 | 0.98 |
| | $Na_2O$ | 16.6 | 16.2 | 16.2 | 16.0 | 13.0 |
| | $K_2O$ | <0.01 | <0.01 | <0.01 | 2.18 | 3.93 |
| | $SO_3$ | 0.25 | 0.28 | 0.23 | 0.31 | 0.29 |
| | $Fe_2O_3$ | 0.031 | 0.015 | 0.016 | 0.020 | 0.018 |
| | $TiO_2$ | 0.020 | 0.010 | 0.010 | 0.020 | 0.010 |
| | Total | 100.0 | 100.1 | 100.0 | 100.1 | 100.0 |
| | RO | 8.3 | 9.9 | 9.8 | 8.3 | 10.9 |
| | CaO/MgO | 0.14 | 0.26 | 0.12 | 0.38 | 0.60 |
| | Specific gravity | 2.500 | 2.474 | 2.460 | 2.517 | 2.526 |
| | Thermal expansion coefficient ($10^{-7}$° $C.^{-1}$) | 91.3 | 90.7 | 90.2 | 99.3 | 100.8 |
| | $T_g$ (° C.) | 572 | 567 | 562 | 564 | 544 |
| | $T_2$ (° C.) | 1493 | 1485 | 1483 | 1483 | 1482 |
| | $T_4$ (° C.) | 1090 | 1069 | 1069 | 1077 | 1069 |
| | Haze after exposure in high temperature and high humidity (%) | 0.8 | 1.0 | 0.5 | 0.3 | 0.6 |
| | CS (MPa) | 967 | 959 | 929 | 940 | 826 |

TABLE 7-continued

|  | Ex. 6 | Ex. 7 | Ex. 8 | Ex. 9 | Ex. 10 |
|---|---|---|---|---|---|
| DOL (μm) | 14.2 | 12.4 | 13.2 | 15.7 | 13.6 |
| Refractive index | 1.517 | 1.510 | 1.508 | 1.518 | 1.517 |
| Photoelastic constant (nmcm/MPa) | 27.9 | 27.4 | 27.6 | 27.4 | 27.1 |

As shown in Table 6 and Table 7, in the glass sheets of Examples, it was understood that the haze was 0.3% to 2.3% and the weathering is unlikely to be generated. On the other hand, in the glass sheets of Comparative Examples, it was understood that the haze was 10% or more and the weathering is likely to be generated.

[Adhesion Test of Pigment 2]

A pigment was printed on the glass sheets shown in the above Table 6 by a screen printing method and the adhesion test of the pigment with respect to the glass sheets was performed. The order of printing the pigment on the glass sheets and the method of the adhesion test were the same as the content of the sample test regarding the above Table 2.

In addition, the adhesion test was performed before and after the operation of generating the weathering in the glass sheets was performed according to the following operation. That is, the glass sheets were put into a thermohygrostat chamber having a temperature of 60° C. and humidity of 95% and exposed to a high temperature and high humidity environment for 240 hours so as to generate the weathering.

The above test results are shown in the following Tables 8 (without weathering) and 9 (with weathering), and FIG. 4 (without weathering) and 5 (with weathering).

In addition, when Examples 3, 4 and 5 are compared to each other, as the CaO/MgO ratio becomes smaller, it was recognized that the expansion of the line width tends to be suppressed.

Considering the results with those of Example 1, Comparative Example 1 and Comparative Example 2 together, in the case where the chemical strengthening treatment is executed to these glasses, it is considered that adhesion to the pigment further becomes strong.

In addition, in the samples of Comparative Examples 3 and 4 in which the weathering was generated, as a result, a lot of omissions (light spots) were recognized within a coating film. In particular, in Comparative Example 4, deterioration to the extent that the pigment-printed part could be seen through was recognized.

[Adhesion Test of Pigment 3]

A pigment was printed on the glass sheets shown in the above Table 7 by a screen printing method and the adhesion test of the pigment with respect to the glass sheets was performed. The order of printing the pigment on the glass sheets and the method of the adhesion test were the same as the content of the sample test regarding the above Table 2.

TABLE 8

|  | Ex. 2 | Ex. 3 | Ex. 4 | Ex. 5 | Comp. Ex. 3 | Comp. Ex. 4 |
|---|---|---|---|---|---|---|
| Change in film appearance (Microscope 100 times) | No change | No change | No change | No change | No change | No change |
| Peeling off of crosscut film (Microscope 25 times) | 0/100 | 0/100 | 0/100 | 0/100 | 1/100 | 2/100 |
| Crosscut line width (μm) (Microscope 100 times) | 86 | 86 | 82 | 54 | 99 | 103 |

TABLE 9

|  | Ex. 2 | Ex. 3 | Ex. 4 | Ex. 5 | Comp. Ex. 3 | Comp. Ex. 4 |
|---|---|---|---|---|---|---|
| Change in film appearance (Microscope 100 times) | Almost no light spots | Almost no light spots | Almost no light spots | Almost no light spots | A lot of light spots | A lot of light spots (Poor light shielding properties) |
| Peeling off of crosscut film (Microscope 25 times) | 0/100 | 5/100 | 0/100 | 0/100 | 0/100 | 0/100 |
| Crosscut line width (μm) (Microscope 100 times) | 95 | 77 | 60 | 52 | 93 | 90 |

Figure 4:
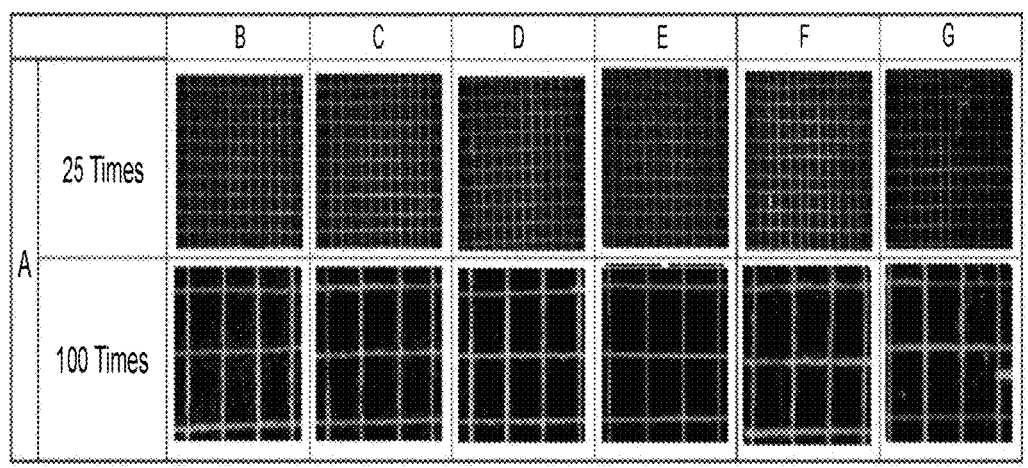
FIG. 4 illustrates results of adhesion tests conducted on glass sheets (with weathering) of Examples 2 to 5, Comparative Example 3 and Comparative Example 4 in Examples.
Figure 5:
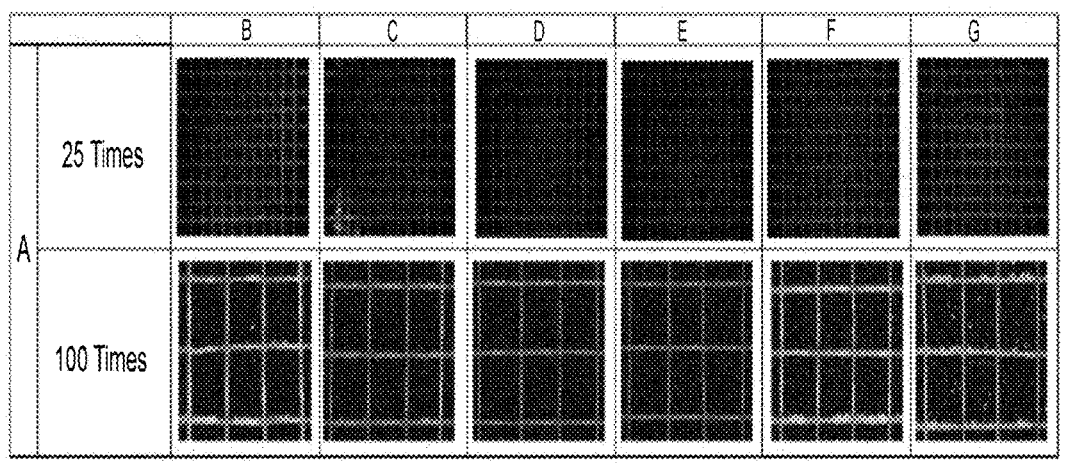
FIG. 5 illustrates results of adhesion tests conducted on glass sheets (without weathering) of Examples 2 to 5, Comparative Example 3 and Comparative Example 4 in Examples.

As shown in Table 8 and FIG. 4, in the samples of Comparative Examples 3 and 4 having less $Al_2O_3$ (without weathering), the peeling off was recognized in the square. As shown in Tables 8 and 9, and FIGS. 4 and 5, in other samples [excluding Example 3 (with weathering)], the peeling off was not recognized in the square.

On the other hand, with regard to the peeling off in the vicinity of the cut line, as a result, it was recognized that, as the glass sheet has less $Al_2O_3$, the peeling off tends to be considerable (the width of the cut line tends to be thick), and in Example 5, the peeling was almost not recognized. In In this adhesion test, a test in which the weathering was generated was not performed.

The above test results are shown in the following Table 10.

TABLE 10

|  | Ex. 6 | Ex. 7 | Ex. 8 | Ex. 9 | Ex. 10 |
|---|---|---|---|---|---|
| Change in film appearance (Microscope 100 times) | No change | No change | No change | No change | No change |

TABLE 10-continued

|  | Ex. 6 | Ex. 7 | Ex. 8 | Ex. 9 | Ex. 10 |
|---|---|---|---|---|---|
| Peeling off of crosscut film (Microscope 25 times) | 0/100 | 0/100 | 0/100 | 0/100 | 0/100 |
| Crosscut line width (μm) (Microscope 100 times) | 60 | 74 | 74 | 80 | 82 |

As shown in Table 10, in any of the Examples, the results were satisfactory, but it is shown that the sample having a low value of CaO/MgO tends to have a smaller width of the cut line.

Examples 11 to 14

Glass sheets having compositions shown in the following Table 11 were prepared according to the same method as the case of Examples 2 to 10, and subjected to immersing treatment at a temperature of 420° C. for 150 minutes using potassium nitrate salt as a test reagent to execute the chemical strengthening treatment. The values of Table 11 are target compositions in the combination of raw materials.

The refractive index and photoelastic constant of Table 11 are values obtained by regression calculation from the glass compositions. Results obtained by analyzing the compositions of the produced glasses by a fluorescent X-ray method are shown in Table 12. $TiO_2$ of Table 12 is impurities included in the raw materials and is not intentionally added thereto. The CS and DOL of the glass sheets of Examples 11 to 14, which has been subjected to the chemical strengthening treatment, are shown in Table 11 together.

TABLE 11

| % by mass | Ex. 11 | Ex. 12 | Ex. 13 | Ex. 14 |
|---|---|---|---|---|
| $SiO_2$ | 72.1 | 71.3 | 70.6 | 70.2 |
| $Al_2O_3$ | 2 | 2.3 | 3 | 2.9 |
| MgO | 7.5 | 6.7 | 9.1 | 9.2 |
| CaO | 3 | 4.3 | 0.6 | 0.6 |
| $Na_2O$ | 15 | 13.6 | 16.3 | 15.2 |
| $K_2O$ | 0 | 1.4 | 0 | 1.5 |
| $Fe_2O_3$ | 0.01 | 0.01 | 0.01 | 0.01 |
| $SO_3$ | 0.36 | 0.36 | 0.36 | 0.36 |
| CaO/MgO | 0.40 | 0.64 | 0.07 | 0.07 |
| CS (MPa) | 785 | 803 | 820 | 818 |
| DOL (μm) | 13.3 | 11.5 | 16.6 | 18.1 |
| Refractive index | 1.507 | 1.509 | 1.505 | 1.506 |
| Photoelastic constant nmcm/MPa | 27.5 | 27.3 | 27.6 | 27.5 |

TABLE 12

|  |  | Ex. 11 | Ex. 12 | Ex. 13 | Ex. 14 |
|---|---|---|---|---|---|
| (% by mass) | $SiO_2$ | 72.3 | 71.5 | 70.8 | 70.4 |
|  | $Al_2O_3$ | 1.90 | 2.18 | 2.92 | 2.77 |
|  | MgO | 7.42 | 6.67 | 9.06 | 9.18 |
|  | CaO | 3.02 | 4.28 | 0.60 | 0.54 |
|  | $Na_2O$ | 15.1 | 13.7 | 16.3 | 15.3 |
|  | $K_2O$ | <0.01 | 1.42 | <0.01 | 1.51 |
|  | $TiO_2$ | 0.01 | 0.01 | 0.01 | 0.01 |
|  | $Fe_2O_3$ | 0.014 | 0.015 | 0.013 | 0.013 |
|  | $SO_3$ | 0.24 | 0.19 | 0.26 | 0.26 |
|  | Total | 100.0 | 100.0 | 100.0 | 100.0 |
|  | CaO/MgO | 0.41 | 0.64 | 0.07 | 0.06 |

The glass sheets of Examples 11 to 14 shown in Table 12 and the glass sheets of Example 2 and Comparative Example 3 shown in Table 6 were chemically strengthened under the aforementioned condition, the strengthened glass sheets were put into a thermohygrostat chamber having a temperature of 60° C. and humidity of 95% and exposed to a high temperature and high humidity environment for 240 hours so as to generate the weathering on the polished surface thereof. The haze value of each glass sheet after the weathering was generated is shown in the following Table 13.

TABLE 13

|  | Ex. 11 | Ex. 12 | Ex. 13 | Ex. 14 | Ex. 2 | Comp. Ex. 3 |
|---|---|---|---|---|---|---|
| Haze after exposure in high temperature and high humidity (%) | 2.9 | 2.8 | 0.7 | 0.7 | 1.1 | 3.6 |

As shown in Table 13, in the glass sheets of Examples, it was understood that the haze was 0.7% to 2.9%, and the weathering is unlikely to be generated. On the other hand, in the glass sheet of Comparative Example, it was understood that the haze was decreased to 3.6% due to the ion exchange effect caused by chemical strengthening, but the weathering is likely to be generated.

[Adhesion Test of Pigment 4]

A pigment was printed on the aforementioned chemically strengthened glass sheets of Examples 11 to 14, Example 2, and Comparative Example 3 according to a screen printing method and the adhesion test of the pigment with respect to the glass sheets was performed. The order of printing the pigment on the glass sheets and the method of the adhesion test were the same as the content of the sample test regarding the above Table 2. In this adhesion test, a test in which the weathering was generated was not performed.

The above test results are shown in the following Table 14.

TABLE 14

|  | Ex. 11 | Ex. 12 | Ex. 13 | Ex. 14 | Ex. 2 | Comp. Ex. 3 |
|---|---|---|---|---|---|---|
| Change in film appearance (Microscope 100 times) | Almost no light spots | Almost no light spots | Almost no light spots | Almost no light spots | Almost no light spots | Almost no light spots |
| Peeling off of crosscut film (Microscope 25 times) | 0/100 | 0/100 | 0/100 | 0/100 | 0/100 | 9/100 |
| Crosscut line width (μm) (Microscope 100 times) | 84.0 | 83.7 | 79.7 | 74.7 | 91.5 | 108.8 |

As shown in Table 14, in the glass sheet of Comparative Example 3, the peeling off was generated in a lot of squares in the test after chemical strengthening, but in the glass of Example 2 and Examples 11 to 14, the peeling off was not generated. Also, in the glass sheets of Examples, the width of the cut line was smaller than that of the glass sheet of Comparative Example.

From the above results, it was understood that a decrease in the CaO/MgO ratio of the glass composition or an increase in the $Al_2O_3$ amount causes the pigment printed after chemical strengthening to be unlikely to be peeled off.

While the present invention has been described in detail and with reference to specific embodiments thereof, it will be apparent to one skilled in the art that various changes and modifications can be made therein without departing from the spirit and scope of the present invention. The present application is based on a Japanese patent application filed on Jul. 7, 2014 (Application No. 2014-140052) and a Japanese patent application filed on May 11, 2015 (Application No. 2015-096288), the whole thereof being incorporated herein by reference. In addition, all references cited herein are incorporated as a whole.

INDUSTRIAL APPLICABILITY

As described above, the pigment-printed glass sheet of the present invention has the suppressed peeling off of the pigment and can be produced at a low cost, and in the case where the glass substrate has been subjected to the chemical strengthening treatment, the strength is excellent as well. Thus, it is appropriate as a cover glass of various image display devices, for example, portable information devices such as a tablet PC, a notebook computer, a smart phone, and an electronic book reader, electronic devices such as a camera, a game console, and a portable music player, liquid crystal televisions, PC monitors, and instrument panels for automobile.

The invention claimed is:

1. A glass sheet, comprising, as represented by mass percentage on the basis of oxides, from 60% to 75% of $SiO_2$, from 2% to 9% of $Al_2O_3$, from 6% to 11% of MgO, from 0% to 4.5% of CaO, from 0% to 3% of SrO, from 0% to 3% of BaO, from 10% to 18% of $Na_2O$, from 0% to 2% of $K_2O$, and from 0% to 4% of $ZrO_2$.

2. The glass sheet according to claim 1, having the content of $Al_2O_3$ of from 3% to 9%.

3. A glass sheet, comprising, as represented by mass percentage on the basis of oxides, from 60% to 75% of $SiO_2$, from 1.5% to 9% of $Al_2O_3$, from 6% to 12% of MgO, from 0% to 4.5% of CaO, from 0% to 3% of SrO, from 0% to 3% of BaO, from 10% to 18% of $Na_2O$, from 0% to 2% of $K_2O$, and from 0% to 4% of $ZrO_2$.

4. The glass sheet according to claim 3, having a mass ratio (CaO/MgO) of the CaO to the MgO of from 0 to 0.67.

5. The glass sheet according to claim 1, which has been subjected to a chemical strengthening treatment.

6. The glass sheet according to claim 1, which has been formed by a float process.

7. A pigment-printed glass sheet, comprising a glass substrate comprising, as represented by mass percentage on the basis of oxides, from 60% to 75% of $SiO_2$, from 2% to 9% of $Al_2O_3$, from 6% to 11% of MgO, from 0% to 4.5% of CaO, from 0% to 3% of SrO, from 0% to 3% of BaO, from 10% to 18% of $Na_2O$, from 0% to 2% of $K_2O$, and from 0% to 4% of $ZrO_2$, the glass substrate having a pigment being printed on at least one surface thereof.

8. A pigment-printed glass sheet according to claim 7, comprising a glass substrate comprising, as represented by mass percentage on the basis of oxides, from 3% to 9% of $Al_2O_3$, the glass substrate having a pigment being printed on at least one surface thereof.

9. A pigment-printed glass sheet, comprising a glass substrate comprising, as represented by mass percentage on the basis of oxides, from 60% to 75% of $SiO_2$, from 1.5% to 9% of $Al_2O_3$, from 6% to 12% of MgO, from 0% to 4.5% of CaO, from 0% to 3% of SrO, from 0% to 3% of BaO, from 10% to 18% of $Na_2O$, from 0% to 2% of $K_2O$, and from 0% to 4% of $ZrO_2$, the glass substrate having a pigment being printed on at least one surface thereof.

10. The pigment-printed glass sheet according to claim 7, wherein the glass substrate has been subjected to a chemical strengthening treatment.

11. A method for producing a pigment-printed glass sheet comprising:
preparing the glass sheet according to claim 1; and
printing a pigment on at least one surface of the glass sheet for pigment printing.

12. An image display device, comprising the pigment-printed glass sheet according to claim 7.

* * * * *